(12) United States Patent
Weinstein et al.

(10) Patent No.: US 7,748,023 B2
(45) Date of Patent: Jun. 29, 2010

(54) DEVICE, SYSTEM AND METHOD FOR CONNECTING A SUBSCRIBER DEVICE TO A WIDEBAND DISTRIBUTION NETWORK

(75) Inventors: Hillel Weinstein, New York, NY (US); Yishaiahu Strull, Tel Aviv (IL); Zeev Orbach, Ashkelon (IL)

(73) Assignee: Xtend Networks Ltd., Tel-Aviv (IL)

( * ) Notice: Subject to any disclaimer, the term of this patent is extended or adjusted under 35 U.S.C. 154(b) by 848 days.

(21) Appl. No.: 11/041,905

(22) Filed: Jan. 25, 2005

(65) Prior Publication Data
US 2005/0155082 A1    Jul. 14, 2005

Related U.S. Application Data

(63) Continuation-in-part of application No. 09/830,015, filed as application No. PCT/IL01/00181 on Feb. 27, 2001, now abandoned.

(30) Foreign Application Priority Data

Jan. 25, 2004  (IL)  .................................. 160035

(51) Int. Cl.
    *H04N 7/173*  (2006.01)
    *H04N 7/16*   (2006.01)
(52) U.S. Cl. ................ 725/127; 725/126; 725/149
(58) Field of Classification Search ............. 725/126
    See application file for complete search history.

(56) References Cited

U.S. PATENT DOCUMENTS

| 4,970,722 A | 11/1990 | Preschutti |
| 5,058,198 A | 10/1991 | Rocci et al. |
| 5,218,714 A | 6/1993 | Ishibashi et al. |
| 5,485,197 A * | 1/1996 | Hoarty ........................ 725/37 |
| 5,499,047 A | 3/1996 | Terry et al. |
| 5,532,733 A | 7/1996 | Wignot |
| 5,600,573 A | 2/1997 | Hendricks et al. |
| 5,701,152 A | 12/1997 | Chen |

(Continued)

FOREIGN PATENT DOCUMENTS

EP    0577351    1/1994

(Continued)

OTHER PUBLICATIONS

International Search Report for International application No. PCT/IL05/00092, mailed on Nov. 17, 2005.

(Continued)

*Primary Examiner*—Dominic D Saltarelli
(74) *Attorney, Agent, or Firm*—Pearl Cohen Zedek Latzer, LLP

(57) ABSTRACT

A method, device and/or system for connecting at least one subscriber device, e.g., a legacy subscriber device, to a wideband distribution network. The device may include, for example, an up-converter to up-convert a subscriber upstream signal within a subscriber upstream frequency band supported by the subscriber device, into an up-converted upstream signal within an upstream sub-band of an extended upstream frequency band; and/or a down-converter to down-convert an extended downstream signal in an extended downstream frequency band, into a down-converted subscriber downstream signal within a subscriber downstream frequency band supported by the subscriber device.

44 Claims, 9 Drawing Sheets

U.S. PATENT DOCUMENTS

| | | | |
|---|---|---|---|
| 5,708,961 A | | 1/1998 | Hylton et al. |
| 5,774,458 A | * | 6/1998 | Williamson ................ 370/276 |
| 5,790,202 A | | 8/1998 | Kummer et al. |
| 5,793,410 A | * | 8/1998 | Rao ........................... 725/120 |
| 5,819,036 A | | 10/1998 | Adams et al. |
| 5,826,167 A | | 10/1998 | Jelinek et al. |
| 5,881,362 A | | 3/1999 | Eldering et al. |
| 5,914,961 A | * | 6/1999 | Harris et al. ................ 370/503 |
| 5,961,603 A | | 10/1999 | Kunkel et al. |
| 5,963,844 A | | 10/1999 | Dail |
| 6,014,547 A | | 1/2000 | Caporizzo et al. |
| 6,134,419 A | | 10/2000 | Williams |
| 6,199,207 B1 | | 3/2001 | Jelinek et al. |
| 6,348,837 B1 | | 2/2002 | Ibelings |
| 6,407,843 B1 | * | 6/2002 | Rowan et al. ............... 398/202 |
| 6,481,013 B1 | | 11/2002 | Dinwiddie et al. |
| 6,487,391 B1 | | 11/2002 | Park |
| 6,536,042 B1 | | 3/2003 | Paul |
| 6,577,414 B1 | | 6/2003 | Feldman et al. |
| 6,615,407 B1 | | 9/2003 | Inaguma |
| 6,785,907 B1 | | 8/2004 | Dan et al. |
| 6,941,576 B2 | | 9/2005 | Amit |
| 2002/0174435 A1 | | 11/2002 | Weinstein et al. |
| 2003/0066088 A1 | | 4/2003 | Jung |
| 2004/0172658 A1 | | 9/2004 | Rakib et al. |
| 2005/0034167 A1 | | 2/2005 | Weinstein et al. |
| 2005/0114903 A1 | | 5/2005 | Ahmed et al. |
| 2005/0283816 A1 | | 12/2005 | Weinstein et al. |

FOREIGN PATENT DOCUMENTS

| | | |
|---|---|---|
| EP | 0589531 | 3/1994 |
| EP | 0742658 | 11/1996 |
| EP | 0695092 | 10/1999 |
| EP | 963116 | 12/1999 |
| WO | WO 96-08925 | 3/1996 |
| WO | WO 99-14953 | 3/1999 |
| WO | WO 99-16201 | 4/1999 |
| WO | WO 01-22364 | 3/2001 |
| WO | WO 01-41890 | 6/2001 |
| WO | WO 01-60066 | 8/2001 |
| WO | WO 03-049225 | 6/2003 |
| WO | WO 03-094347 | 11/2003 |
| WO | WO 03-103287 | 12/2003 |
| WO | WO 2004/047443 | 6/2004 |

OTHER PUBLICATIONS

Electroline Electronic Equipment Inc. "Increasing Subscribers & Improving Profitability with Addressable Taps". © Nov. 1999.

European Search Report for EP 02 72 7999, mailed Jun. 1, 2005.

International Search Report for PCT/IL01/00181, mailed Apr. 25, 2002.

International Search Report for PCT/IL00/00655, mailed Apr. 25, 2002.

Xtend Netvvorkds Ltd: "Xtending Cable Network Bandwitdth to 3GHz" Internet Article, Dec. 3, 2003, XP002546517.

"Xtending Cable Bandwith—an Alternative to Node Splitting" Internet Citation, XP002202041.

Search Report of European Application No. EP 05 70 3135 mailed on Oct. 15, 2009.

* cited by examiner

XTB

DEVICE, SYSTEM AND METHOD FOR CONNECTING A SUBSCRIBER DEVICE TO A WIDEBAND DISTRIBUTION NETWORK

CROSS-REFERENCE TO RELATED APPLICATIONS

This application claims the benefit of Israel Patent Application 160035, filed Jan. 25, 2004; and is a Continuation-In-Part of U.S. patent application Ser. No. 09/830,015, filed Jul. 20, 2001 now abandoned, as a National Phase Application of International Patent Application PCT/IL0100181, filed on Feb. 27, 2001, and published Apr. 25, 2002 as International Publication number WO02/33969, which in turn claims priority from International Patent Application PCT/IL0000655, filed Oct. 16, 2000, and published Apr. 25, 2002 as International Publication number WO02/33968, the disclosures of all of which are incorporated herein by reference in their entirety.

FIELD OF INVENTION

The present invention relates, in general, to cable television distribution networks, and, more particularly, to processing of wideband Cable Television signals.

BACKGROUND OF THE INVENTION

Cable Television (CATV) is a form of broadcasting that transmits programs to subscribers via a physical land based infrastructure of coaxial ("coax") cables or via a combination of fiber-optic and coaxial cables (HFC).

Traditionally, analog services providing CATV content have been carried over an electronic signal having a frequency range (band) of about 75-500 MHz. Typically, the legacy frequency band of about 5-42 MHz is dedicated to upstream transmissions sent from subscribers of the CATV networks to a cable network head end. CATV operators must continue to provide analog contents within analog channels for economic, regulatory, and legal reasons. As a result, about 130-450 MHz or the 130-550 MHz frequency band remains dedicated to the transmission of the traditional analog channels. The recent advent of technology requires the suitable expansion of the transmission spectrum or the frequency bandwidth of carrier signals sent and received across the physical distribution path.

In some modern CATV networks, e.g., some CATV networks implemented in the U.S.A. as well as in certain other countries, a legacy frequency band of approximately 5-860 MHz is used. A large portion of the frequency band, e.g., a frequency bandwidth of between 700 MHz and 800 MHz, is generally used for legacy downstream transmissions from the cable head end equipment to the subscriber, while a relatively narrow portion, e.g., less than 40 MHz in the US and less than 60 MHz in Europe, is generally used for upstream transmissions between the subscriber and the head end. Until lately, this asymmetry had not been a concern due to the prevailing transmission needs of upstream traffic. Typically, upstream traffic comprised subscriber-submitted requests involving subscriber demands for the reception of video programs, music programs, live radio transmissions, data files, multimedia content, applications, and the like, in the downstream. The volume of these files has been typically much higher than the volume of the respective requests. As a result early proprietary cable modem systems and the subsequent Data Over Cable Service Interface Specification (DOCSIS) called for spectrally efficient modulation schemes in the downstream path and relatively low-rate but robust schemes in the upstream path. Recent trends suggest that data, as well as voice and video traffic over HFC networks is becoming gradually more symmetric as certain applications and services demand using an upstream channel having a relatively wide upstream bandwidth. However, the upstream channel of the typical CATV networks is relatively narrow and cannot supply the demand for upstream traffic even if such upstream traffic is compressed.

The present alternatives, such as the use of Fiber-optic To The Home (FTTH) last-mile networks, are expensive and require replacing/modifying the standard subscriber end devices with devices specifically designed to operate in such networks. In addition, the 5-42 MHz (or 5-65 MHz in some countries) frequency band, which is utilized as the upstream path, is heavily affected by ingress noise. Ingress noise in a CATV network is typically generated by the operation of electric household devices as well as other EMI, RFI pick-ups in the vicinity of the drop system and the subscriber premises. Ingress noise is especially critical at the lower frequencies. Because currently the only portion of the transmission spectrum used for the upstream path is the 5-42 MHz or the 5-65 MHz frequency band, ingress noise is a dominant problem for the CATV operators attempting to implement two-way services. The result is that less than 20 MHz can be operatively used for efficient high-speed data transmission in the upstream path due to the noise funneling effect of the upstream path. It is becoming widely accepted that a large percent of ingress noise problems stem from a drop system (drop and subscriber premises) of the network, and only a small percent of ingress noise originates in the trunk and feeder network. In addition, a hard line of the feeder network is typically well shielded and better maintained, whereas the drop system generally has lower shielding and/or isolation quality. Furthermore, the drop system is generally the least accessible, least controllable and least maintained portion of the network. In an effort to speed the activation of the reverse plant, many CATV operators currently install high-pass filters and windowed filters at the subscriber end, e.g., in each and every user's home. Unfortunately, although such filtering methods may be fairly effective and affordable, heavy reliance on filtering can be only a limited and/or temporary solution.

Persistent commercial competition between CATV operators and Satellite (DBS) and/or Telephone Operators (Telcos), requires the continuous improvement of the services provided to their subscribers, such as the addition of new video and audio channels, more flexible programming, more symmetrical data transfer capabilities, telephone and video services over cable, T1/E1 type performance that requires guaranteed symmetric bandwidth, multi-user games over CATV networks, video telephony that requires symmetrical bandwidth, and other advanced services. The above-mentioned limitation concerning the availability of the bandwidth for digital services may hinder the ability of the CATV operators to compete successfully on today's extremely dynamic market where new cable network-related services are being developed and implemented continuously and new requests are made constantly by the increasingly sophisticated customer base concerning the enhancement of the desired programming mix. This results in an ever-growing need for a wider bandwidth.

SUMMARY OF EMBODIMENTS OF THE INVENTION

Some exemplary embodiments of the invention include methods, systems and/or devices for connecting at least one subscriber device, e.g., a legacy subscriber device, to a wideband distribution network.

Some embodiments of the invention include a method and a wideband subscriber interface apparatus to down-convert extended downstream signals in an extended downstream frequency band, e.g., including at least a sub-set of an extended frequency band of 5-3000 MHz, into downstream signals in a predetermined frequency band, for example, including at least a sub-set of a legacy CATV band of 5-1000 MHz and/or a subscriber downstream frequency band. Additionally or alternatively, the apparatus may be able to up-convert upstream signals in a predetermined upstream frequency band, e.g., including at least a sub-set of a legacy upstream frequency band of 5-60 MHz, into extended upstream signals in a frequency sub-band of an extended upstream frequency band.

The interface apparatus and/or method according to embodiments of the invention may enable using existing, e.g., standard, Customer Premises Equipment (CPE) devices, without the need to modify and/or replace the CPE units with CPE units specifically designed to enable communicating over the extended frequency band.

According to some exemplary embodiments of the invention, an apparatus for connecting a subscriber device to a wideband distribution network supporting a wide frequency band including at least a legacy downstream frequency band, a legacy upstream frequency band and an extended upstream frequency band, may include an up-converter to up-convert a subscriber upstream signal within a subscriber upstream frequency band supported by the subscriber device, into an up-converted upstream signal within an upstream sub-band of the extended upstream frequency band.

According to one exemplary embodiment, the apparatus may include a network diplexer able to selectively route a downstream signal in the legacy downstream frequency band from the network to the subscriber device; and selectively route the up-converted upstream signal to the network. The apparatus may also include a subscriber diplexer to selectively route the subscriber upstream signal to the up-converter; and selectively route the downstream signal in the legacy downstream frequency band to the subscriber device.

According to some exemplary embodiments of the invention, the network may support an extended downstream frequency band, and the apparatus may additionally or alternatively include a down-converter to down-convert an extended downstream signal in the extended downstream frequency band into a down-converted downstream signal within a downstream frequency band supported by the subscriber device.

According to one exemplary embodiment, the apparatus may include a multiplexer able to selectively route the extended downstream signal to the down-converter; and selectively route the up-converted upstream signal to the network. The multiplexer may further be able to selectively route a downstream signal in the legacy downstream frequency band from the network to another subscriber device supporting the legacy downstream frequency band; and selectively route an upstream signal in the legacy upstream frequency band from the other subscriber device to the network. The apparatus may also include a diplexer to selectively route the subscriber upstream signal to the up-converter; and selectively route the down-converted downstream signal to the subscriber device.

According to another exemplary embodiment of the invention, the apparatus may include a subscriber multiplexer to selectively route an upstream signal in the legacy upstream frequency band from the subscriber device to a network multiplexer; and selectively route the down-converted downstream signal to the subscriber device. The apparatus may also include a network multiplexer may also be able to selectively route the extended downstream signal to the down-converter; and selectively route the upstream signal in the legacy frequency band to the network. The network multiplexer may also be able to selectively route a downstream signal in the legacy downstream frequency band from the network to the subscriber multiplexer, and the subscriber multiplexer may be able to selectively route the downstream signal in the legacy downstream frequency band to the subscriber device.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings in which:

Figure 1A:
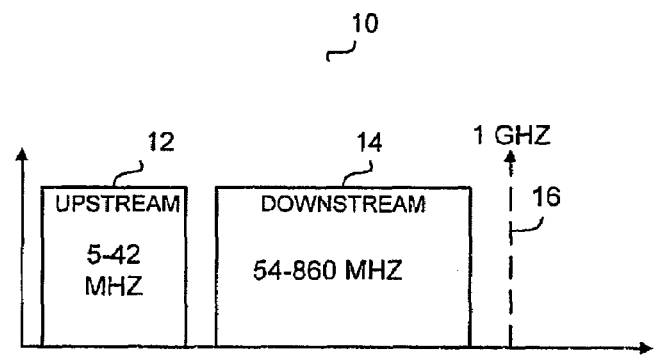
FIG. 1A is a schematic illustration of a spectral scheme of a conventional cable television (CATV) distribution network.

It will be appreciated that for simplicity and clarity of illustration, elements shown in the drawings have not necessarily been drawn accurately or to scale. For example, the dimensions of some of the elements may be exaggerated relative to other elements for clarity or several physical components included in one functional block or element. Further, where considered appropriate, reference numerals may be repeated among the drawings to indicate corresponding or analogous elements. Moreover, some of the blocks depicted in the drawings may be combined into a single function.

DETAILED DESCRIPTION OF EXEMPLARY EMBODIMENTS OF THE INVENTION

In the following detailed description, numerous specific details are set forth in order to provide a thorough understanding of the invention. However, it will be understood by those of ordinary skill in the art that the present invention may be practiced without these specific details. In other instances, well-known methods, procedures, components and circuits may not have been described in detail so as not to obscure the present invention.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices. In addition, the term "plurality" may be used throughout the specification to describe two or more components, devices, elements, parameters and the like.

Some exemplary embodiments of the invention include methods, systems and/or devices for connecting at least one subscriber device, e.g., a legacy subscriber device, to a wideband distribution network.

Embodiments of a wideband distribution network supporting a wide frequency band, in accordance with exemplary embodiments of the invention, are described in U.S. patent application Ser. No. 09/830,015, filed Jul. 20, 2001, entitled "SYSTEM AND METHOD FOR EXPANDING THE OPERATIVE BANDWIDTH OF A CABLE TELEVISION COMMUNICATION SYSTEM", and published Nov. 21, 2002 as UP Publication Number US20020174435 (Reference 1), in International Patent Application PCT/IL0000655, filed Oct. 16, 2000, entitled "SYSTEM AND METHOD FOR EXPANDING THE OPERATIVE BANDWIDTH OF A CABLE TELEVISION COMMUNICATION SYSTEM", and published Apr. 25, 2002 as International Publication number WO02/33968 (Reference 2), in International Patent Application PCT/IL02/00342, filed May 2, 2002, entitled "A WIDEBAND CATV SIGNAL SPLITTER DEVICE", and published Nov. 13, 2003 as International Publication number WO03/094347 (Reference 3), in U.S. patent application Ser. No. 10/892,052, filed Jul. 14, 2003, entitled "A WIDEBAND CATV TAP DEVICE" (Reference 4), and in U.S. patent application Ser. No. 10/869,578, filed Jun. 16, 2004, entitled "A WIDEBAND NODE IN A CATV NETWORK" (Reference 5), the disclosure of all of which is incorporated herein by reference.

Some exemplary embodiments of the invention provide a method and wideband subscriber interface device (also referred to herein as "XTB") to enable connecting one or more subscriber devices, for example, Customer Premises Equipment (CPE) devices, e.g., legacy CPE devices, to the wideband network. For example, the subscriber interface device may be connectable to a standard Set Top Box (STB), a cable modem, e.g., a Data Over Cable Service Interface Specification (DOCSIS) cable modem, and/or any other suitable subscriber device. As described in References 1, 2, 3, 4, and 5, the wideband network may include a wideband node device for transmitting/receiving signals in the wide frequency band including an extended downstream frequency band and/or an extended upstream frequency band.

According to exemplary embodiments of the invention, the subscriber interface device may be able to convert an extended downstream signal in an extended downstream frequency band received from the node into a downstream signal in a frequency band supported by the subscriber device, e.g., a legacy frequency band supported by the standard cable modem or STB; and/or convert an upstream signal in a frequency supported by the subscriber device into an extended upstream signal in an extended upstream frequency band to be transmitted to the node, as described in detail below. Thus, the subscriber interface device may allow, for example, the use of extended frequency bands within the CATV network, while retaining the use of, e.g., existing, legacy equipment at the subscriber's location.

In some exemplary embodiments of the invention the interface device may be used for connecting a legacy subscriber device, e.g., supporting a legacy frequency band of 5-860 MHz, to a wideband network supporting, for example, a wide frequency band of 5-3000 MHz. For example, the interface device may be able to down-convert an extended downstream signal in an extended frequency band, e.g., a frequency band of at least a sub-set of a frequency band in the range of 1000-3000 MHz, into a signal in another frequency band, e.g., a frequency band of at least a sub-set of the legacy frequency band in the range of 5-860 MHz. Additionally or alternatively, the device may be able to up-convert an upstream signal in an upstream frequency band, e.g., a frequency band of at least a sub-set of a frequency band of 5-60 MHz, supported by a subscriber device, into a signal in a sub-band, e.g., having a frequency bandwidth of 30-40 MHz, of the extended frequency band.

In some exemplary embodiments of the invention described herein, the term "wide frequency band" may refer to an exemplary frequency band of, e.g., 5-3000 MHz; the term "extended upstream frequency band" may refer to an exemplary frequency band of 2250-2750 MHz; the term "extended downstream frequency band" may refer to an exemplary frequency band of 1250-1950 MHz; the term "legacy upstream frequency band" may refer to an exemplary frequency band of 5-42 MHz or 5-60 MHz; the term "legacy downstream frequency band" may refer to an exemplary frequency band of 54-860 MHz; and the term "legacy frequency band" may refer to an exemplary frequency band of 5-860 MHz. However, it will be appreciated by those skilled in the art that in other embodiments of the invention, these exemplary frequency bands may be replaced with any other suitable wide frequency band, extended upstream frequency band, extended downstream frequency band, legacy downstream frequency band, legacy upstream frequency band, and/or any desired frequency band. For example, the systems, devices and/or methods of some embodiments of the invention may be adapted for a wide frequency band of between 5 MHz and more than 3000 MHz, e.g., 4000 MHz, and/or a legacy band of 5-1000 MHz.

Some exemplary embodiments of the invention may include performing operations for the division and/or the modification of bandwidth blocks. A method including such operations is referred to as Block Division Multiplexing (BDM). The implementation of the BDM method may enable the adding up of services (through the use of a wide band signal) to the CATV network subscribers without changing the coaxial wires in the "last mile" physical infrastructure. The BDM method may involve the down-conversion of frequencies and associated signals from an extended frequency band into a legacy frequency band The BDM method may additionally or alternatively involve the up-conversion of frequencies and associated signals from the legacy frequency band into the extended frequency band. The implementation of the BDM in the wideband subscriber interface device may allow for the continued operation of the existing legacy equipment, such as legacy STBs and/or modems, without modifications.

Thus, a system, method and/or apparatus according to embodiments of the invention may be implemented to enable the continued utilization of existing legacy CPE devices. This may obviate the need for modifying legacy CPE devices and/or adding new CPE devices.

The subscriber interface device may be installed, for example, in the subscriber's premises between a wall outlet and at least one subscriber device, e.g., a STB and/or a cable modem. For example, a first end of the wideband subscriber interface device may be connected to the wall outlet via which, in the downstream, a wideband CATV signal may be fed from the CATV distribution network to the subscriber premises. On the upstream side, the wideband CATV signal may be fed to a CATV head-end via a node device. The subscriber interface device may be connected at a second end to the at least one subscriber device installed on the subscriber's premises.

Referring now to FIG. 1A, which schematically illustrates a spectral scheme 10 of a conventional CATV distribution network. Scheme 10 may include an upstream portion 12 and a downstream portion 14. Hereinafter, a portion of a spectrum may also be referred to as a band or sub-band of the spectrum. Upstream band 12 may span a frequency region of about 5-42 MHz, or 5-60 Mhz. Upstream band 12 may be used for data traffic and signaling from a CPE of a subscriber via a CATV distribution network to a head end. The upstream data generated by the CPE may include, for example, diverse requests and/or demands and/or commands and/or data submitted by the subscriber, such as ordering of pay-per-view programs, participation in various surveys, playing of games, requesting data files, and the like. Downstream band 14 may span a frequency range of about 54-860 MHz, or 60-1000 MHz. Downstream band 14 may be used for transmission of the regular ubiquitous analog and digital CATV channels to the subscriber from the head end. Downstream band 14 could also be used for other diverse applications, such as transmission of data files, pay-per-view programs, voice transmission in telephony applications, and the like.

Figure 1B:
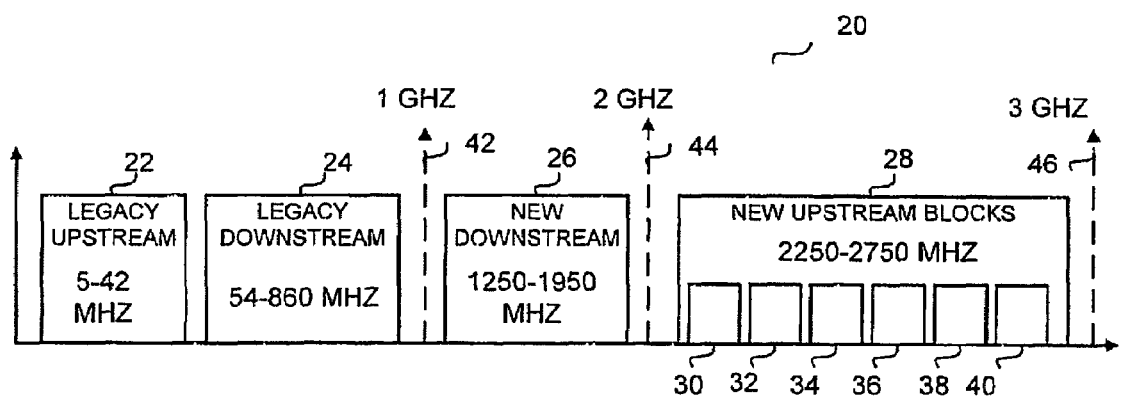
FIG. 1B is a schematic illustration of an extended spectral scheme of a CATV network in accordance with some exemplary embodiments of the invention.

Referring to FIG. 1B, which schematically illustrates an extended spectral scheme 20 of a CATV network, in accordance with some exemplary embodiments of the invention. The spectral scheme of FIG. 1B may enable transmission of signals having a considerably extended frequency range ("wideband signals"). In one exemplary embodiment of the invention, the wideband signals may be modulated over carriers in a frequency band of about 5-3000 MHz, or even higher. The substantial extension of the frequency range, e.g., from about 5-860 MHz to about 5-3000 MHz may enable the provision of a plurality of new digital services to the subscriber, including but not limited to two-way, symmetrical or near-symmetrical applications. The term symmetrical herein refers to any system in which data transfer rate and/or capacity may be similar in both directions, averaged over time In FIG. 1B, scheme 20 may include a legacy upstream band 22, a legacy downstream band 24, an extended downstream band 26, and an extended upstream band 28. In order to accommodate the existing legacy services (currently providing analog TV channels, digital TV channels, and the like) the legacy upstream band 22, e.g., of about 5-42 MHz, and/or the legacy downstream band 24, e.g., of about 54-860 MHz, may be designed to be functionally and/or structurally equivalent, e.g., identical, to the upstream band 12 and downstream band 14 of FIG. 1A, respectively. The extended downstream band 26 may be allocated, for example, a frequency range of about 1250-1950 MHz. Band 26 may be designed to provide additional services to the subscriber, such as a video-on-demand, high-definition TV (HDTV), music-on-demand, Internet access, cable telephony, e-mail, video telephony, video conferencing, and the like. Band 26 may carry other service-specific content from the head end to the subscriber. Extended upstream band 28 may be allocated, for example, a frequency range of about 2250-2750 MHz. Band 28 may be operative in carrying DOCSIS-compliant data encoding additional service-specific content in the direction from the subscriber to the head end. Band 28 may be divided into discrete frequency sub-bands, e.g., sub-bands 30, 32, 34, 36, 38, and 40, wherein one or more sub-band may have, for example, a bandwidth of about 30-40 MHz, so as to be compatible with legacy upstream standards and to provide considerable volume increase in upstream traffic. A more detailed description of the functionality of frequency sub-bands 30, 32, 34, 36, 38, 40 of extended upstream band 28 is set forth herein below in conjunction with the following drawings. Persons skilled in the art will appreciate that the frequency ranges shown in FIG. 1B are exemplary ranges and other frequency ranges may be allocated to band 26 and/or band 28.

Figure 2:
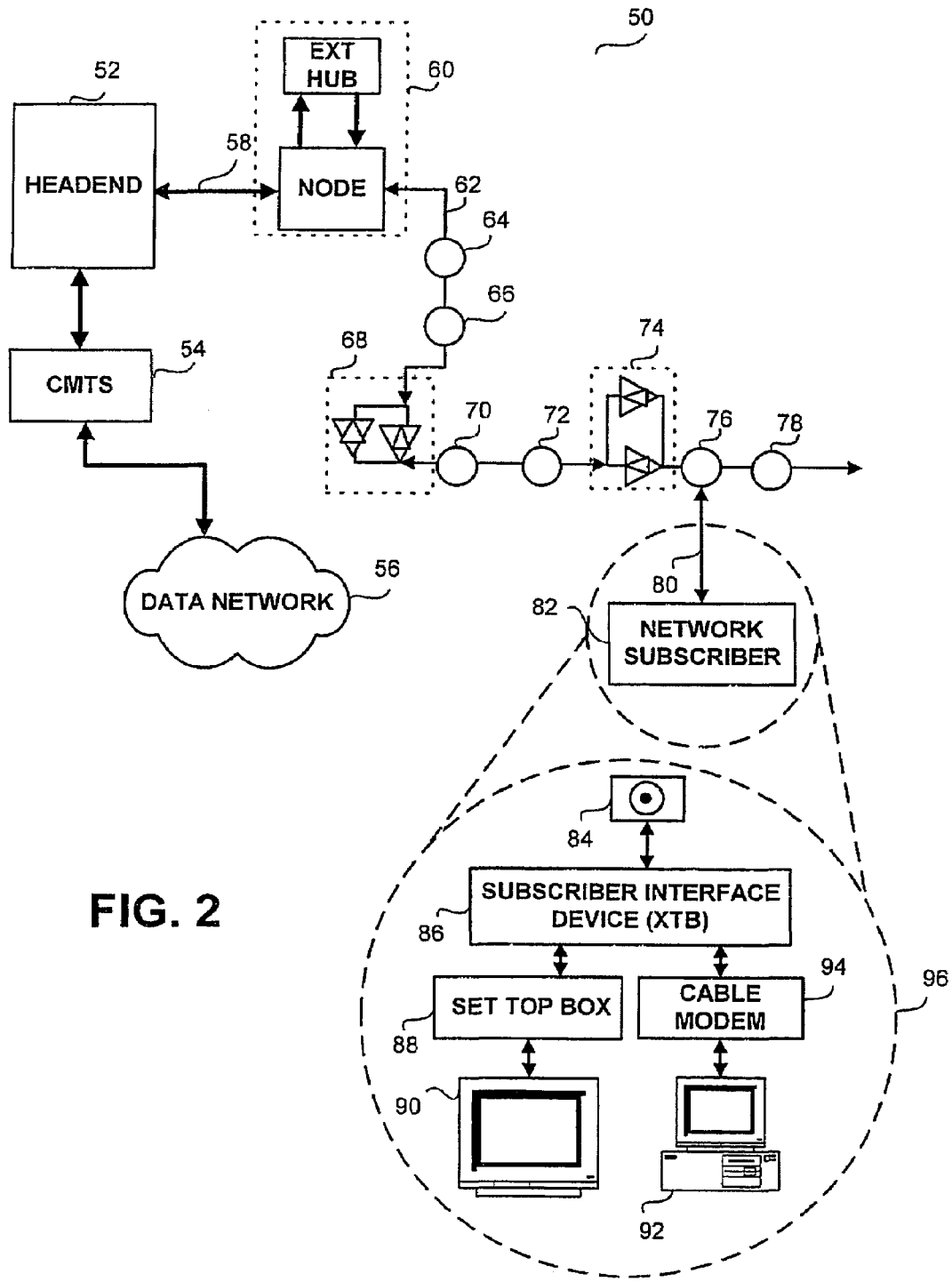
FIG. 2 is simplified schematic illustration of a CATV system in accordance with some exemplary embodiments of the invention.

Reference is made now to FIG. 2, which schematically illustrates a CATV system 50, in accordance with some exemplary embodiments of the invention. In one exemplary embodiment of the present invention an XTB 86 may be installed within CATV system 50, as described in detail below.

According to the exemplary embodiments of FIG. 2, CATV system 50 may include, among other devices, a network head-end 52, a Cable Modem Termination System (CMTS) interface 54, a CATV network wideband node device 60, and a CATV distribution network for connecting node 60 to XTB 86. The CATV distribution system may include, for example, a plurality of wideband tap devices 64, 66, 70, 72, 76, 78, and a plurality of wideband line extension amplifiers 68, 74. System 50 may also include an infrastructure of cabling devices 58 and 62, in the trunk section and in the distribution section of the system respectively, which could be fiber optic cables, coaxial cables or a combination thereof. Cabling devices 58 and 62 may connect network head-end 52 with a network subscriber 82 operating one or more CPE devices 96. CMTS 54 may be installed typically in head-end 52. CMTS 54 may be linked to a wide-area data communication network 56, such as the Internet, via a network browser (not shown). Downstream CATV signals, e.g., having a frequency range of about 100-800 MHz, may be fed, via cabling device 58, via CATV network wideband node device 60, via cabling device 62, via wideband line extension amplifiers 68, 74 to wideband tap devices 64, 66, 70, 72, 76, and 78. According to exemplary embodiments of the invention, one or more of devices installed within the CATV distribution network 50 may be suitably adapted and/or upgraded for the transmission of wideband signals in accordance with the descriptions of References 1, 2, 3, 4, and/or 5. The wideband signals may be fed from wideband tap device 76 via a tap drop cable 80 to a CATV network subscriber 82. Subscriber 82 may operate CPE devices 96. CPE devices 96 may include, for example, a wall outlet 84, wideband subscriber interface unit (XTB) 86, a legacy STB 88, a legacy cable modem 94 such as a DOCSIS-compliant modem, a television set (TV device) 90, a computing device 92 such as a desktop computer, a laptop computer, and/or any other suitable subscriber device. The wideband signal may first be relayed from tap device 76 to wall outlet 84, and then from wall outlet 84 to XTB 86. In the downstream direction, XTB 86 may process an extended downstream signal by down-converting the extended downstream signal in the extended downstream band (e.g., of about 1250-1950 MHz) into a downstream signal in the legacy downstream band (e.g., of about 54-860 MHz) supported by a subscriber device, e.g., cable modem 94, and may route the down-converted signal to the subscriber device, as described below. A legacy downstream signal may be routed by XTB 86 to the legacy STB 88, e.g., without any modifications. STB 88 may pass the subscriber-selected sub-band of the legacy portion of the signal to TV device 90, and cable modem 94 may feed the suitable subscriber-selected sub-band of the down-converted signal to computing device 92. In the upstream direction, which may be used to communicate specific requests submitted by subscriber 82 through input devices such as computing device 92 and/or control devices of TV device 90, a subscriber-specific upstream signal may be fed to cable modem 94 and/or to legacy set-top box 88. These devices may relay the upstream signals to XTB 86. XTB 86 may up-convert the subscriber-specific signal into a pre-defined frequency sub-band within the extended upstream band, e.g., in the 2250-2750 MHz range, and thereby overlay the wideband signal with the up-converted sub-band. XTB 86 may then selectively route the wideband signal upstream via wall outlet 84 and drop cable 80 to tap device 76, via the infrastructure of cabling device 62 and wideband node device 60, to CATV network head-end 52. XTB 86 may also selectively route to the network legacy upstream signals, e.g., received from STB 88, as described below.

Exemplary structures and functionalities of wideband node device 60 are described in detail in Reference 5. The wideband node device, e.g., as described by Reference 5, enables the transmission of wideband signals in a wide frequency band including a legacy band, e.g., of about 5-860 MHz, an extended downstream band, e.g., of about 1000-2000 MHz, and an extended upstream band, e.g., of about 2000-3000 MHz. The extended upstream band enables transfer in the upstream direction of data, using multiple upstream sub-bands. The operation of wideband node device 60 may include a method for frequency division, conversion, and multiplexing, such as multiplexing a number of pre-defined sub-band signals allocated in the extended upstream band, e.g., of about 2000-3000 MHz, into a combined wideband signal, e.g., of about 5 to 3000 MHz.

Still referring to FIG. 2, request signals may be encoded and transmitted to corresponding network addresses of data communications network 56 by CMTS router interface 54. In response to a specific request from the transmitted signal, a suitably addressed remote network unit may download the requested information to a browser associated with CMTS 54. CMTS 54 may encode the received information into a signal, e.g., to become a wideband CATV signal carrying the requested information in a pre-defined manner. The wideband CATV signal may be carried downstream via the CATV network infrastructure to the specific network subscriber 82. Note should be taken that although on the drawing under discussion only a limited number of tap devices and drop cable devices and only a single network subscriber and an associated complex of CPE devices are shown, in a realistic environment a plurality of tap devices may be installed across the CATV network feeding a plurality of CPE devices with the downstream signal. The plurality of tap devices may further receive upstream signals from the plurality of CPE devices and may transmit the upstream signals back to the network head-end. Note should also be taken that in some embodiments of the invention, network head-end 52 may include other diverse devices. For example, network head-end 52 may further include a satellite receiver/transmitter for applications involving satellite access.

Figure 3:
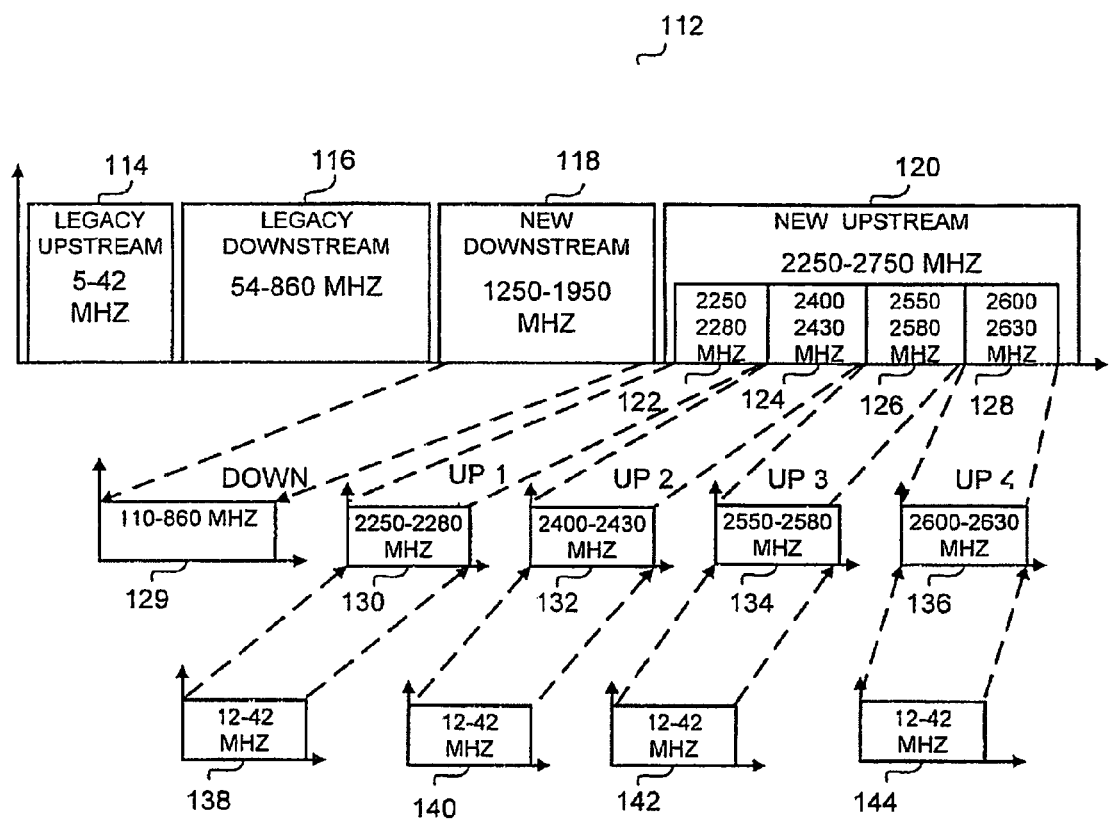
FIG. 3 is a schematic illustration of an extended spectral scheme including a plurality of extended upstream frequency sub-bands, in accordance with an exemplary embodiment of the invention.

Reference is now made to FIG. 3, which schematically illustrates an extended spectral scheme 112 including a plurality of extended upstream frequency sub-bands, in accordance with an exemplary embodiment of the invention. The boundaries of the spectral scheme of FIG. 3 may be substantially identical to those of FIG. 1B. In one exemplary embodiment of the invention, scheme 112 may include an extended frequency range of about 5-3000 MHz. Note should be taken that in other preferred embodiments, scheme 112 may have a broader bandwidth, such as about 5-4000 MHz, or even broader. In yet other embodiments, scheme 112 may include a narrower bandwidth, such as of 5-1000 MHz. Scheme 112 may include several pre-defined bands carrying a function-specific type of content information, such as a TV channel, a music channel, and the like. A legacy upstream band 114, e.g., of about 5-42 MHz, may be reserved for the current legacy upstream content information, for example, encoded requests submitted by a network subscriber relating to a specific order of pay-per-view TV programs, residential Internet access, and the like. The requests may be encoded onto the CATV signal and sent upstream from CPE 96 (FIG. 2) via wideband node device 60 (FIG. 2) to head-end 52 (FIG. 2). A legacy downstream band 116, e.g., of about 54-860 MHz, may carry legacy downstream content, such as analog and digital CATV channels provided for network subscriber 82 (FIG. 2) to be selectively received, processed and/or displayed on TV device 90 (FIG. 2). An extended downstream band 118, e.g., within the frequency range of about 1250-1950 MHz, may carry additional downstream content, such as multi-media content, e.g., provided by remote computers and/or services coming from data communication network 56 (FIG. 2) in response to requests submitted by network subscriber 82 (FIG. 2). An extended upstream band 120, e.g., of about 2250-2750 MHz, may be allocated to carry requests submitted by network subscriber 82 (FIG. 2) concerning desired data, such as multi-media content from data communication network 56 (FIG. 2). Extended upstream band 120 may be sub-allocated into frequency sub-bands having a bandwidth of, for example, about 30 MHz, where one or more sub-bands, e.g., sub-bands 122, 124, 126, and/or 128, may carry data from a specific CPE complex associated with a specific network subscriber The sub-allocation of extended upstream band 120 may be pre-determined and performed by the suitable components of XTB 86 (FIG. 2), e.g., as described below. Upon the submittal of a communication request by network subscriber 82 (FIG. 2) a subscriber-specific signal, for example, a signal 138, 140, 142, or 144, e.g., of a frequency band of about 12-42 MHz, may be generated and relayed to a specific XTB, for example, XTB 86 (FIG. 2), unique to the specific subscriber. Signal 138, 140, 142, or 144 may be up-converted by the specific XTB in a pre-programmed manner into a specific sub-band, for example, sub-band 130, 132, 134, or 136. Signal 138, 140, 142, or 144, associated with a specific subscriber, may be up-converted into different frequency sub-bands where the frequency limits are defined in a pre-determined scheme and stored, for example, as parameters of a micro controller, which may be included in XTB 86 (FIG. 2), e.g., as described below with reference to FIG. 4. For example, sub-band 138 of about 12-42 MHz may be up-converted into a sub-band 130 of about 2250-2280 MHz; sub-band 140 of about 12-42 MHz may be up-converted into a sub-band 132 of about 2400-2430 MHz; sub-band 142 of about 12-42 MHz may be up-converted into a sub-band 134 of about 2550-2580 MHz; and/or sub-band 144 of about 12-42 MHz may be up-converted into a sub-band 136 of about 2600-2630 MHz. The up-converted sub-bands 130, 132, 134, and/or 136 may now be capable of serving subscribers at considerably higher data transfer rates, and may be spectrally overlaid on extended upstream band 120, e.g., of about 2250-2750 MHz by XTB 86 (FIG. 2), as described in detail below. In the downstream, XTB 86 (FIG. 2) may down-convert signals in extended downstream band 118 into signals in a band 129, e.g., of about 100-860 MHz, supported by the subscriber device. A more detailed description of the structure, functionality and operation of XTB 86 (FIG. 2) will be provided herein below in association with their respective drawings. Note should be taken that the above-described frequency band allocations are exemplary only. In accordance with the operative requirements of the type of service provided to the network subscriber, the limits of the bands as well as the sub-allocation limits within a certain band could differ. Further note should be taken that although on the drawing under discussion only four sub-allocation bands are shown, the size and the number of the sub-allocated frequency bands could vary in accordance with the size of the extended upstream band.

Figure 4:
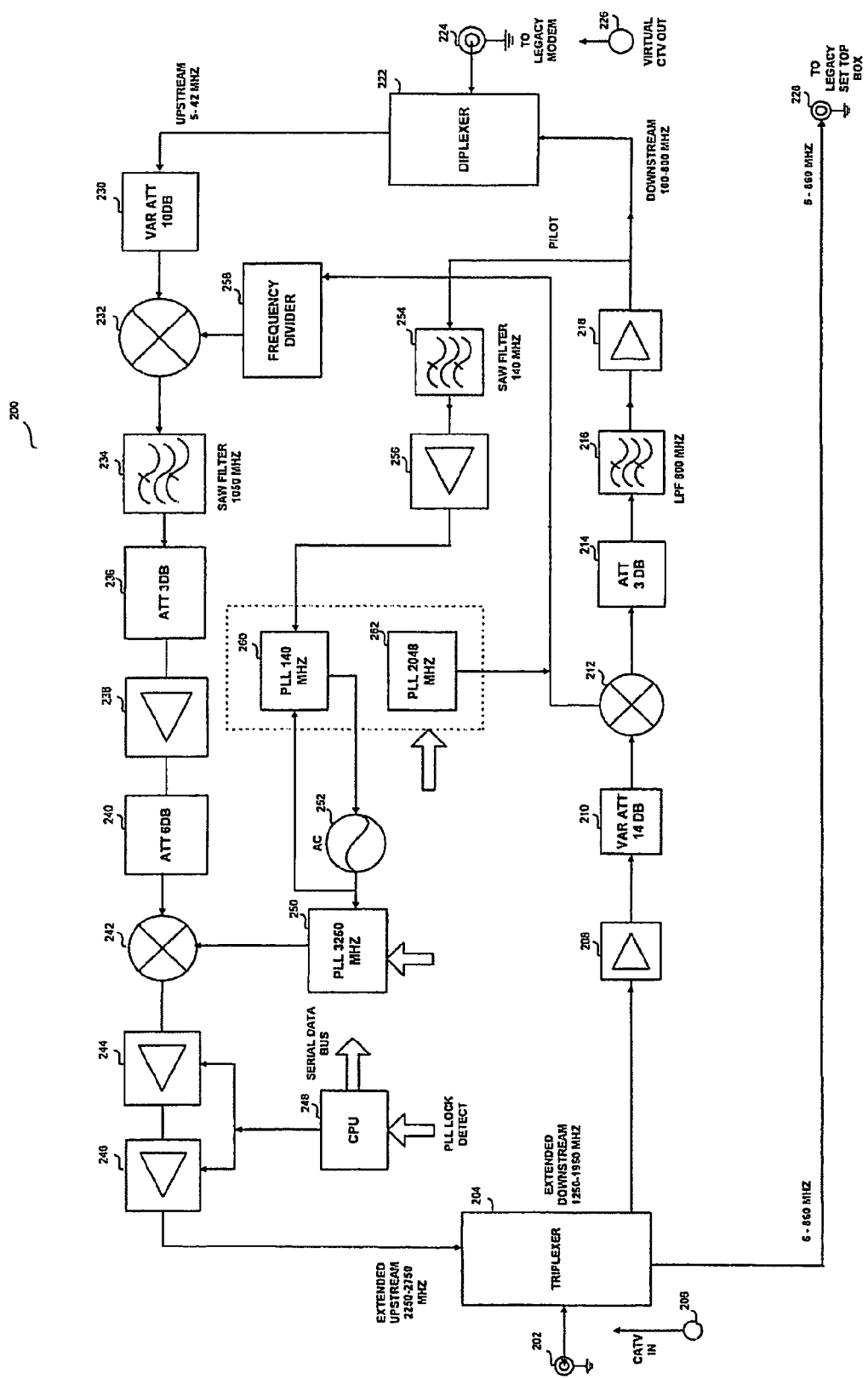
FIG. 4 is a schematic illustration of a subscriber interface apparatus in accordance with an exemplary embodiment of the invention.

Reference is now made to FIG. 4, which schematically illustrates a subscriber interface device 200, in accordance with one exemplary embodiment of the invention. Although the invention is not limited in this respect, device 200 may be adapted to connect at least one subscriber device to a wideband network supporting the frequency plan of FIG. 3B.

Device 200 may include a multiplexer, e.g., triplexer device 204, and a diplexer device 222. Device 200 may also include a down-converter, e.g., a downstream mixer 212, a first downstream amplifier 208, a downstream variable attenuator 210, a downstream fixed attenuator 214, a downstream low pass filter 216, and a second downstream amplifier 218. Device 200 may also include a CPU (or micro-processor, or the like) 248, an up-converter, e.g., a first upstream phase mixer 232, an upstream variable attenuator 230, a first SAW filter 234, a first upstream fixed attenuator 236, an upstream amplifier 238, a second upstream fixed attenuator 240, a second upstream phase mixer 242, a first upstream shutdown amplifier 244, and a second upstream shutdown amplifier 246. Device 200 may also include a first PLL controller 250, a second PLL controller 260, a third PLL controller 262, a second SAW filter 254, a control signal amplifier 256, and a frequency divider 258. CPU 248 may be programmed to control the first and second upstream shutdown amplifiers 246 and 244, and the first, second, and third PLL controllers 250, 260, and 262. PLL controller 250 may control mixer 242, PLL controller 260 may control signal source 252, and/or PLL controller 262 may drive mixer 212. The first, second, and third PLL controllers 250, 260, and 262 may operate in accordance with control instructions delivered by CPU 248 through a serial data bus. Triplexer 204 may be connected to wall outlet 84 (FIG. 2) via port 202. Diplexer 222 may be connected to legacy cable modem 94 (FIG. 2) via port 224. Port 228 may be connected to legacy set-top box 88 (FIG. 2).

Still referring to FIG. 4, in the downstream, an extended downstream signal and/or a legacy downstream signal may be fed from network head-end 52 (FIG. 2), via CATV network cable infrastructure 58 and 62 (FIG. 2), via wideband node device 60 (FIG. 2), via wideband tap device 76 (FIG. 2), via wall outlet 84 (FIG. 2), and via port 202, to triplexer 204. The frequency range and frequency plan of the wideband signals may be designed to be functionally and/or structurally equivalent, e.g., identical, to the downstream frequency bands of FIG. 3. In one exemplary embodiment of the invention, extended downstream frequency band 118 (FIG. 3) may be adapted to carry data transmitted from data network 56 of FIG. 2. Legacy downstream band 116 may include the frequency content of signals that carry the legacy components of the content provided by a CATV distribution network, such as analog and digital television channels. Triplexer 204 may be able to selectively route a legacy downstream signal, e.g., in legacy downstream band 116 (FIG. 3), to port 228; and to selectively route an extended downstream signal, e.g., in extended downstream band 118 (FIG. 3) to mixer 212, e.g., via amplifier 208. Triplexer 204 may also be able to route an extended upstream signal, e.g., in a sub-band of extended upstream frequency band 120 (FIG. 3), to port 202. For example, triplexer 204 may include a plurality of filtering sections, adapted to selectively pass signals of predetermined frequency bands corresponding to the legacy downstream frequency band, the extended downstream frequency band, the extended upstream frequency band, and/or the legacy upstream frequency band. Triplexer 204 may include any other suitable arrangement and/or configuration. The legacy downstream signal may be subsequently processed by legacy set-top box 88 and relayed to TV device 90 (FIG. 2). The extended downstream signal may be amplified by the first downstream amplifier 208, and attenuated by downstream variable attenuator 210. The extended downstream signal may be down-converted by mixer 212, e.g., from a signal in a frequency range of about 1250-1950 MHz, into a down-converted downstream signal, e.g., in a frequency range of about 100-800 MHz. Next, the down-converted signal may be attenuated by downstream attenuator 214 and filtered by downstream low pass filter 216, e.g., to eliminate local oscillating frequency harmonics. The down-converted signal may then be amplified by second downstream amplifier 218 and, following amplifier 218, the down-converted signal may be fed into diplexer 222. Diplexer 222 may selectively route the down converted signal to a subscriber device, e.g., legacy cable modem 94 of FIG. 2, via port 224. The legacy cable modem 94 may process the signal and send the signal to computing device 92 of FIG. 2. The signal may be appropriately decoded and the information carried therein may be processed, stored and/or displayed, e.g., to enable interaction with the network by a network subscriber via the control devices of computing device 92. The extended downstream band 118 may also be used for transferring a pilot signal, e.g., at a frequency of about 1908 MHz or any other desired frequency. The function of the pilot signal may be, for example, to maintain signal coherence. Mixer 212 may down-convert the pilot signal, e.g., to a frequency of about 140 MHz or any other desired frequency. The pilot signal may be fed through SAW filter 254 to control signal amplifier 256 into PLL 260. PLL 260 may control the crystal controlled frequency source 252 in accordance with the pilot signal frequency to determine the frequency limits of sub-bands in the extended upstream sub-band. PLL 262 may control mixer 212 in accordance with a set of pre-defined instructions received from CPU 248.

Still referring to FIG. 4, in the upstream, diplexer 222 may receive from cable modem 94 a subscriber-specific upstream signal, for example, signal 138, 140, 142, or 144 (FIG. 3). These signals may be generated in response to specific requests and/or demands and/or commands submitted by various subscribers concerning controlled access and interaction with remotely located computing devices throughout data network 56 (FIG. 2). Diplexer 222 may selectively route the subscriber upstream signal to mixer 232, e.g., via attenuator 209. For example, diplexer 222 may include a filtering section that passes a subscriber-specific upstream signal, e.g., having a frequency range of about 5-42 MHz. Diplexer 222 may include any other suitable arrangement and/or configuration. Variable attenuator 230 may attenuate the subscriber-specific upstream signal, and first upstream phase mixer 232 may up-convert the upstream signal into an intermediate frequency sub-band. The up-converted signal may be filtered by upstream SAW filter 234, attenuated by first upstream attenuator 236, amplified by upstream amplifier 238, attenuated by second upstream attenuator 240, and up-converted by second upstream phase mixer 242. The frequency limits of the sub-allocated sub-band into which the signal is up-converted may be controlled by PLL 250, which may be controlled in turn by instructions sent from CPU 248 and by the signal generated by the frequency source 252 responding to the value of the pilot signal frequency. The up-converted signals 130, 132, 134, and 136 (FIG. 3) may be relayed optionally through an upstream shutdown section, which may include a first shutdown amplifier 244 and a second shutdown amplifier 246. In accordance with the control instructions delivered from CPU 248 via a serial data bus, amplification of the signals may be disabled, thereby to cause an effective lowering of the signal strength, e.g., to prevent data network access upon a fault condition. CPU 248 may initiate the shutdown option following reception of a local access-lock detection signal. The up-converted signals of sub-bands 130, 132, 134, and 136 may be respectively overlaid, e.g., on extended upstream sub-band 120 in FIG. 3, e.g., of about 2300-2900 MHz. The extended upstream signal may be fed into triplexer 204. Triplexer 204 may selectively route the extended upstream signal to network head-end 52 of FIG. 2 via the CATV cable infrastructure.

According to the exemplary embodiments of FIG. 4, the functions of the wideband subscriber interface device may include at least one of: a) receiving a wideband downstream signal from a CATV distribution network; b) down-converting the extended downstream signal into a subscriber downstream signal in a downstream frequency band supported by a first subscriber device, e.g., a cable modem; c) routing a legacy downstream signal to a second subscriber device, e.g., a legacy STB; d) routing the down-converted signal to the first subscriber device; e) routing legacy upstream signals received from the second subscriber device to the CATV network; f) receiving subscriber-specific upstream data from the first subscriber device; g) up-converting the upstream data into a pre-defined frequency sub-band within the extended upstream band; and h) routing the up-converted signal to the CATV network.

It will be appreciated that conversion of the frequency range and the frequency scheme of the wideband CATV infrastructure may extend both downstream and upstream bandwidth and thereby enable the CATV operators to add new channels with new services without replacing costly legacy CPE devices. In addition, since the upstream data is fed from the CPE through the drop system within the high frequency portions of the signal, the ingress noise (typically introduced into the lower frequency signal in the subscribers' premises and in the drop system) may be significantly reduced. In addition, the carrying of upstream data in high-frequency sub-bands may enable the use of high-order efficient modulation schemes in the upstream direction.

It would be readily appreciated by persons with ordinary skills in the art that the above description of the wideband subscriber interface device (XTB) is exemplary only. The same objectives and/or any other objectives may be achieved by applying different components, alternative interconnections, different component values and the like. Diverse supplementary functions could be added to enhance the operation of the interface device and diverse advanced applications could be contemplated that could benefit from concepts underlying the operation of the device.

According to other exemplary embodiments of the invention, the XTB may be adapted to connect between subscriber devices supporting other frequency bands, and/or wideband networks supporting other frequency spectral schemes, e.g., as described below.

Figure 5A:
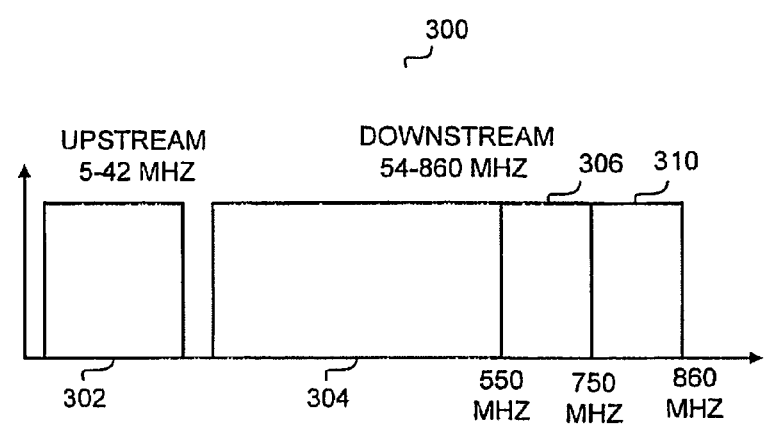
FIG. 5A is a schematic illustration of another spectral scheme of a conventional CATV distribution network, including a plurality of downstream frequency portions.

FIG. 5A schematically illustrates another spectral scheme 300 of a conventional CATV distribution network, including a plurality of downstream frequency portions. FIG. 5A illustrates variations of frequency range availability in the downstream in a legacy CATV distribution network. Scheme 300 may include an upstream band 302 of 5-42 MHz and a downstream band of 54-860 MHz. The downstream band may be divided into a first band 304 with an upper frequency limit of 550 MHz, a second band 306 with an upper frequency limit of 750 MHz, and a third band 310 with an upper frequency limit of 860 MHz. The upper limit of the combined downstream band is network-specific and may be determined by a CATV operator, e.g., taking into consideration the penetration of the last-mile upgrades. The upstream band 302 may be used for carrying data from the CPE of a network subscriber via the CATV distribution network to a head end. The upstream signal may be generated by the CPE in response to the introduction of diverse requests and/or demands and/or commands and/or data by the subscriber. The downstream bands 304, 306, 310 may be used for transmitting regular analog and digital channels from the head end to the subscriber. The downstream bands 304, 306, 310 could be further used for other diverse applications, such as for the transmission of additional data, pay-per-view programs, voice transmission in telephony applications and the like.

Figure 5B:
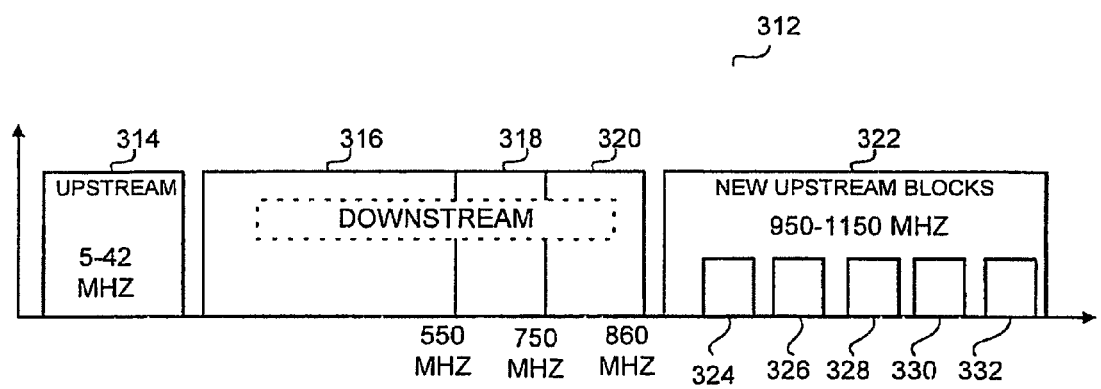
FIG. 5B is a schematic illustration of an extended transmission spectral scheme including a plurality of extended upstream frequency sub-bands, in accordance with another exemplary embodiment of the invention.

Reference is now made to FIG. 5B, which schematically illustrates an extended transmission spectral scheme 312 including a plurality of extended upstream frequency sub-bands, in accordance with another exemplary embodiment of the invention. Scheme 312 may include a legacy upstream band 314, a legacy downstream band including bands 316, 318, and 320, and an extended upstream band 322. In order to accommodate the existing legacy services (e.g., currently available analog and digital TV channels, and the like), the legacy upstream band of 5-42 MHz and/or the legacy downstream bands 316, 318, 320 of 54-860 MHz may be designed to be functionally and/or structurally equivalent, e.g., identical, to upstream band 302 and/or downstream bands 304, 306, and 310 of FIG. 5A, respectively. Extended upstream band 322 may be allocated, for example, a frequency range of 950-1150 MHz. Band 322 may be operative, for example, to carry DOCSIS-compliant data with encoded service-specific content in the upstream direction from the subscriber to the head end. Band 322 may be divided into several, for example, 5 to 8, frequency sub-bands, e.g., sub-bands 324, 326, 328, 330, and 332, thereby to increase the capacity of upstream traffic. One or more sub-bands may provide for an upstream channel of about 5-42 MHz bandwidth. A more detailed description of the functionality of frequency sub-bands 324, 326, 328, 330, and 332 in the extended upstream band 322 is set forth herein below in conjunction with the associated drawings. It would be readily appreciated by persons with ordinary skill in the art that the addition of upstream and/or downstream frequency bands, as described herein, is exemplary only. Other component values and frequency bands may be used in a similar fashion through different allocation of bandwidth resources to suit varying needs of CATV networks.

Figure 6:
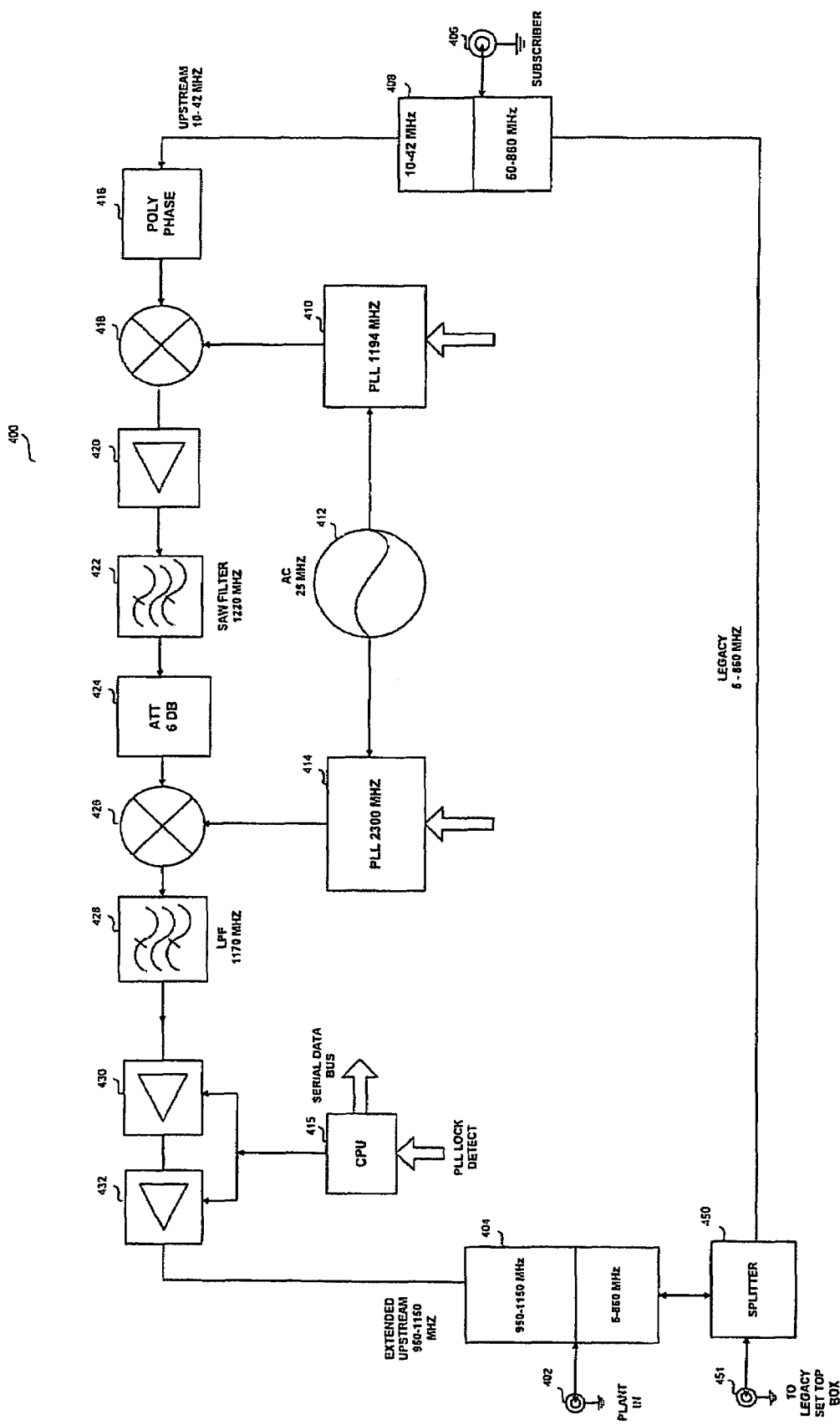
FIG. 6 is a schematic illustration of a subscriber interface apparatus in accordance with another exemplary embodiment of the invention.

Reference is now made to FIG. 6, which schematically illustrates a subscriber interface device 400, in accordance with another exemplary embodiment of the invention. Although the invention is not limited in this respect, device 400 may be adapted to connect at least one subscriber device to a wideband network supporting the frequency plan of FIG. 5B.

Device 400 (also referred to herein as "1 GHZ-XTB") may be operative in providing the addition of a predetermined number of extended channels, for example, up to 6 or 8 extended upstream channels associated with extended upstream frequency sub-bands, while keeping the infrastructure of the existing CATV distribution network substantially intact. The number of extended upstream sub-bands that may be added may be determined, for example, in accordance with the upper limit of the downstream bands 316, 318, and 320. The 1 GHZ-XTB device 400 may include a network diplexer 404, a subscriber diplexer 408, a splitter 450, an upstream poly-phase device 416, an up converter, e.g., a first upstream phase mixer device 418, an upstream amplifier device 420, an upstream SAW filter 422, a second upstream phase mixer device 426, an upstream fixed attenuator 424, an upstream low-pass filter 428, a first upstream shutdown amplifier 430, a second upstream shutdown amplifier 432, a CPU (or microprocessor) 415, a first PLL controller 410, a second PLL controller 414, and/or a signal source 412. CPU 415 may be programmed to control the first and second upstream shutdown amplifiers 430, 432, PLL controller 410, and PLL controller 414. PLL controller 410 may drive mixer 418, and PLL controller 414 may drive mixer 426. The first and second PLL controllers 410 and 414 may operate in accordance with control instructions delivered by CPU 415 through a serial data bus. Diplexer 404 may be connected to wall outlet 84 of FIG. 3 via port 402. Diplexer 408 may be connected to legacy cable modem 94 of FIG. 2 via port 406. Splitter 450 may be connected to diplexer 404. Splitter 450 may split the legacy signal, e.g., having a frequency range of 5-860 MHz, into two signals to be provided to a CATV port 451 and to a subscriber port 406, respectively. The splitting may be symmetrical, e.g., 1:1, or in any other desired ratio.

Still referring to FIG. 6, the structure, functionality, and operation of the 1 GHZ-XTB 400 along the downstream direction will now be described. In the downstream, the downstream signal may be received by diplexer 404 from network head-end 52 (FIG. 2), via CATV network infrastructure of cabling devices 58 and 62 of FIG. 2, via node device 60 of FIG. 2, via specific tap device 76 of FIG. 2, via wall outlet 84 of FIG. 2, and via port 402. The frequency range and frequency plan of the signal may be substantially identical to the frequency range and frequency plan of FIG. 5B. In some embodiments of the invention, the signal received may have a frequency range of about 5-1150 MHz, although the invention is not limited to this example. Diplexer 404 may be adapted to selectively route a legacy downstream signal, e.g., in the legacy downstream frequency bands 316, 318 and/or 320, to splitter 450; and to selectively route an up-converted upstream signal, e.g., received from mixer 418, to the network, e.g., via port 402. Diplexer 404 may also be able to selectively route a legacy upstream signal, e.g., received from port 451, to the network. For example, diplexer 404 may include at least one filtering section to selectively pass a legacy spectrum, e.g., of about 5-860 MHz, between port 402 and splitter 450; and to selectively pass the up-converted signal to port 402. Diplexer 404 may include any other suitable arrangement and/or configuration. Diplexer 408 may selectively route the legacy downstream signal received from splitter 450 to port 406. The legacy downstream signal may be processed by set-top box 88 (FIG. 2), and relayed to TV device 90 (FIG. 2). Thus, the legacy portion of the signal may be suitably preserved and selectively routed to the appropriate CPE devices.

Still referring to FIG. 6, in the upstream direction, diplexer 408 may receive from cable modem 94 (FIG. 2) a subscriber-specific upstream signal, e.g., a signal generated in response to specific requests and/or demands and/or commands submitted by the subscriber concerning controlled access and interaction with remotely located computing devices across data network 56 (FIG. 2). Diplexer 408 may selectively route the subscriber-specific upstream signal to poly-phase device 416, e.g., using a filter for selectively passing a frequency range of about 5-42 MHz, or any other suitable arrangement or configuration. The subscriber-specific upstream signals may be fed from diplexer 408 via an upstream path to diplexer 404. The upstream path may include first upstream phase mixer 418 to up-convert the upstream signal to an intermediate frequency range. The up-converted signal may be amplified by upstream amplifier 420, filtered by first SAW filter 236, attenuated by upstream attenuator 424, up-converted by second upstream phase mixer 426, and filtered by low pass filter 428. The frequency limits of the sub-band into which the signal is up-converted may be controlled by PLL 414, which may be controlled in turn by instructions sent from CPU 415 and/or by a signal generated from frequency source 412. The subscriber-specific upstream signal of 5-42 MHz may be up-converted into a signal of a pre-defined frequency sub-band, e.g., having a width of 30 MHz, and overlaid on the new upstream sub-band 322 of, e.g., 950-1150 MHz. The up-converted signals may be optionally fed via an upstream shutdown section, which may include a first upstream shutdown amplifier 430 and a second upstream shutdown amplifier 432. In accordance with the control instructions delivered from CPU 415 via a serial data bus, amplification of the signals may be disabled and thereby could cause the effective lowering of signal strength to prevent data network access. CPU 415 may initiate the shutdown option in response to reception of a local access-lock detection signal. Extended upstream signal 312 may then be fed into diplexer 404. Diplexer 404 may selectively route the extended upstream signal to network head-end 52 (FIG. 2), via CATV cable infrastructure. Note should be taken that in some preferred embodiments of the invention, the signal routed from diplexer 404 to head end 52, via the CATV distribution network, may have a frequency range of about 5-1150 MHz.

According to the exemplary embodiments of FIG. 6, the functions of the wideband subscriber interface device may include at least one of: a) selectively routing a legacy downstream signal to first and second subscriber devices, e.g., a legacy modem device and/or a legacy STB; b) selectively routing legacy upstream signals received from the second subscriber device to the network; c) receiving subscriber-specific upstream data from the first subscriber device; d)

up-converting the upstream data into a pre-defined frequency sub-band within the extended upstream band; and e) selectively routing the up-converted signal to the CATV network.

Modifications of the frequency range and frequency plan of the signal, as described above, may extend the upstream bandwidth and thereby enable the CATV operators to add new two-way services while obviating the need to replace passive CATV infrastructure components, such as splitters, taps, and the like, or legacy CPE devices. In addition, since the upstream data is fed from the CPE through the drop system within the high frequency portions of the signal, the ingress noise (which may be introduced to the signal in the subscribers' premises and in the drop system) may be significantly reduced. The frequency conversion of the upstream data may further enable the use of high-order modulation schemes in the upstream.

It would be readily appreciated by persons with ordinary skill in the art that the above description of the 1 GHz XTB device 400 is exemplary only. The same or similar objectives may be accomplished by applying different components, alternative interconnections, different component values and the like. Diverse supplementary functions could be added to enhance the operation of the interface device and diverse advanced applications could be contemplated that could benefit from the concept underlying the operation of the device.

Figure 7A:
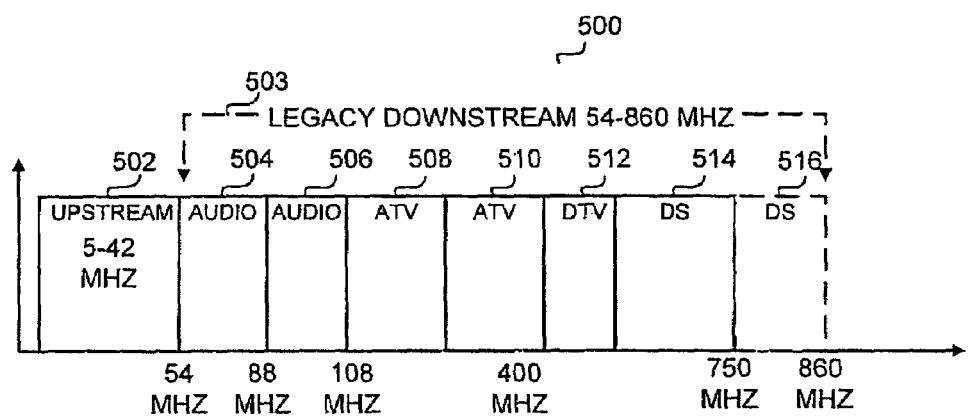
FIG. 7A is a schematic illustration of a yet another spectral scheme of a conventional CATV distribution network, including a plurality of downstream frequency portions.

FIG. 7A schematically illustrates yet another spectral scheme 500 of a conventional CATV distribution network, including a plurality of downstream frequency portions. Scheme 500 may include an upstream band 502 and a downstream band 503. Upstream band 502 may span a frequency range of about 5-42 MHz. The upstream band 502 may be used for carrying data from the CPE of a network subscriber to a network head-end via a CATV distribution network. The upstream data generated by the CPE may include diverse requests and/or demands and/or commands submitted by the subscriber, such as the ordering of pay-per-view programs, the performance of surveys, games, and the like. The downstream band 503 may span a frequency range of about 54-860 MHz. The downstream band 503 may be divided into narrower sub-bands, wherein each such narrower sub-band may carry specific media content. For example, sub-band 504 of, e.g., 54-88 MHz, may carry a first audio channel, and sub-band 506 of, e.g., 88-108 MHz, may carry a second audio channel. Sub-bands 508 and 510 of, e.g., 108-400 MHz may carry analog TV broadcast content, whereas sub-bands 512, 514, and 516 of, e.g., 400-750 or 400-860 MHz, may carry digital TV content and additional digital services. In other words, analog TV content may be kept at frequencies below 400 MHz, whereas digital video broadcasting may start at around 400 MHz.

Figure 7B:
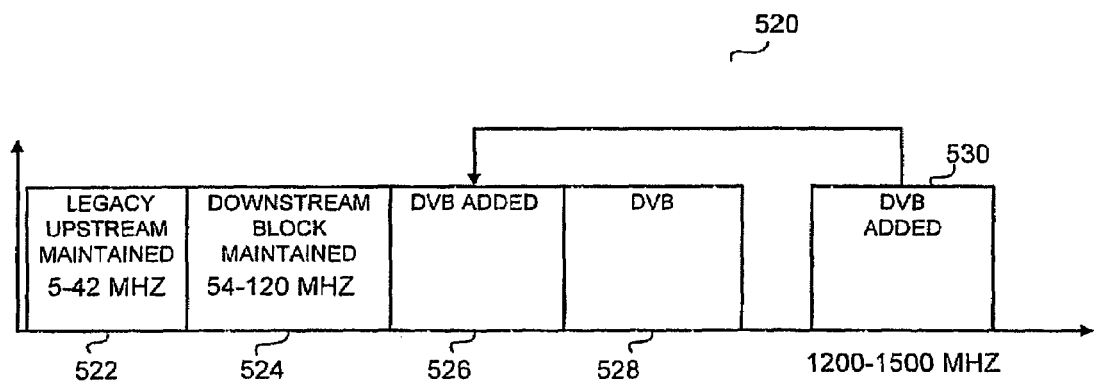
FIG. 7B is a schematic illustration of an extended spectral scheme including an extended downstream frequency band, in accordance with another exemplary embodiment of the invention.

Reference is now made to FIG. 7B, which schematically illustrates an extended spectral scheme 520 including an extended downstream frequency band, in accordance with another exemplary embodiment of the invention. Scheme 520 may include a frequency range of, e.g., about 5-1500 MHz. Scheme 520 may include a legacy upstream band 522 of 5-42 MHz, a legacy downstream band 524 of about 54-120 MHz, a DVB added band 526, a DVB band 528, and an extended downstream band 530 of about 1200-1500 MHz.

According to exemplary embodiments of the invention, extended downstream signals, e.g., in the extended downstream portion of 1200-1500 MHz, may be generated by node 60 (FIG. 2). The extended downstream signal may be detected by a wideband subscriber interface unit, e.g., as described below with reference to FIG. 8, at the customer's premises. The extended downstream band may be down-converted, e.g., into a down-converted signal within the frequency band of 100-400 MHz, and may be added to the legacy band, e.g., of 400-860 MHz, carrying DVB programming. Since a legacy digital set-top box is tunable, e.g., within 120-860 MHz, the digital set-top box can operate in full capacity adding numerous Video-On-Demand channels, HDTV channels and other digital broadcasts.

Figure 8:
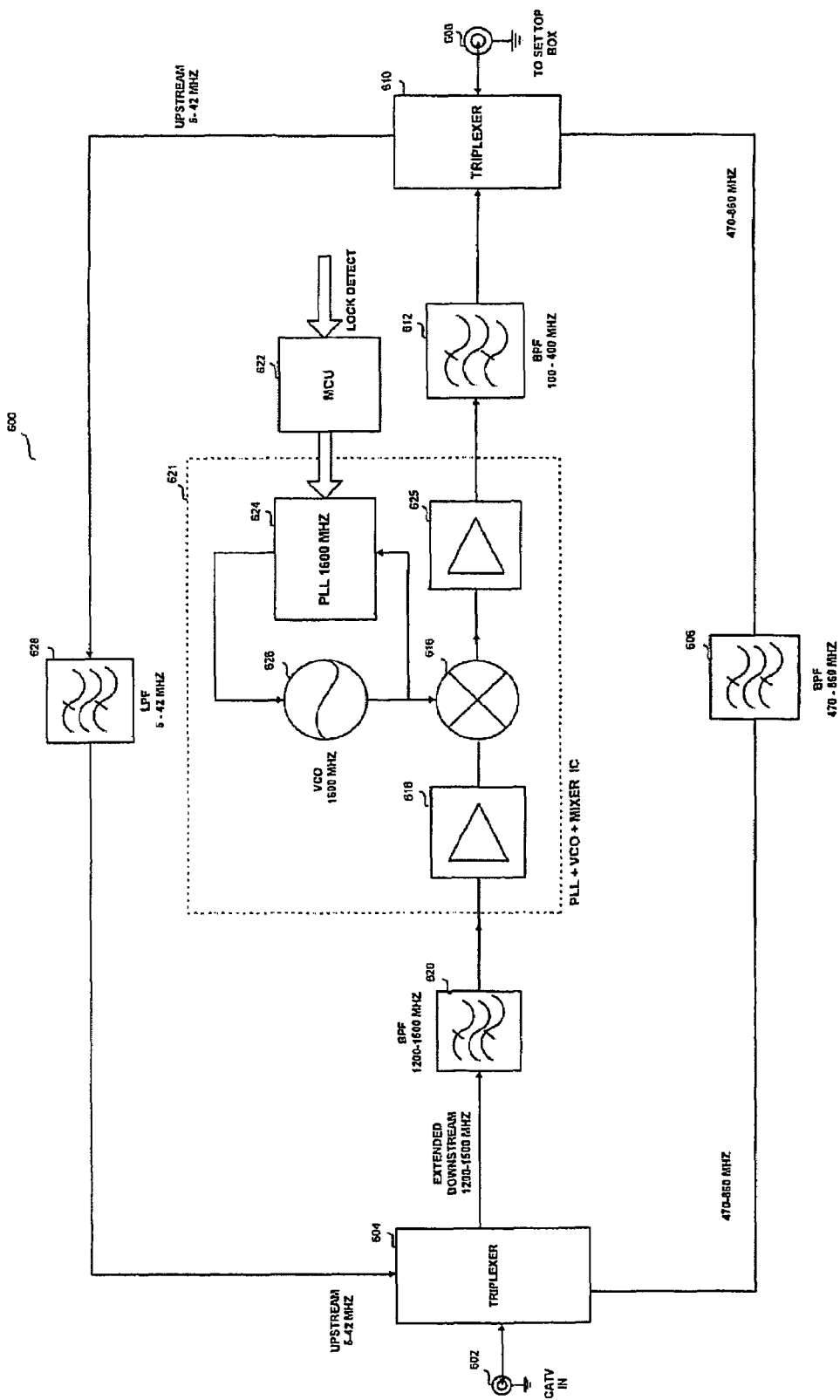
FIG. 8 is a schematic illustration of a subscriber interface apparatus in accordance with yet another exemplary embodiment of the invention.

Reference is now made to FIG. 8, which schematically illustrates an interface device 600 in accordance with yet another exemplary embodiment of the invention. Although the invention is not limited in this respect, device 600 may be adapted to connect at least one subscriber device to a wideband network supporting the spectral scheme of FIG. 7B.

According to the exemplary embodiments of FIG. 8, device 600 (also referred to herein as "XDTV-XTB") may provide frequency conversion of bands within at least part of a wideband range of about 5-1500 MHz into bands in a legacy spectrum portion of about 5-860 MHz. The frequency conversion may enable legacy CPE devices to handle the modified sub-bands, e.g., within the legacy frequency range of about 5-860 MHz. XDTV-XTB 600 may include a first multiplexer, e.g., triplexer device 604, a second multiplexer, e.g., triplexer device 610, a first downstream band pass filter 620, a second downstream band pass filter 606, a third downstream band pass filter 612, a first upstream low pass filter 628, a first downstream amplifier 618, a second downstream amplifier 625, a down-converter, e.g., a mixer device 616, a signal generator device 626, a PLL device 624, and a MCU device 622. Triplexer 604 may receive a wideband signal from a port 602. The wideband signal may include a legacy downstream signal or an extended downstream signal. Triplexer 604 may selectively route the legacy downstream signal to triplexer 610; and selectively route the extended downstream signal to mixer 616, e.g., via amplifier 618. For example, triplexer 604 may include at least one filtering section to selectively transfer signals, e.g., of a frequency band of about 470-860 MHz, to triplexer 610; and to selectively transfer signals, e.g., of a frequency band of about 1200-1500 MHz, to mixer 616. Triplexer 604 may include any other suitable arrangement and/or configuration. The extended downstream signal in a sub-band of about 1200-1500 MHz may be down-converted, e.g., into a down-converted signal in a frequency band of about 100-400 MHz, e.g., by an IC chip 621, which may include at least PLL 618, VCO 626, and Mixer 616, and may be controlled by a programmable micro-controller unit (MCU) 622. Triplexer 610 may selectively route the down-converted signal and/or the legacy downstream signal to the subscriber's set top box, e.g., via a port 608. Triplexer 610 may also be adapted to selectively route an upstream signal, e.g., in a frequency band of about 5-42 MHz, to diplexer 604. Diplexer 604 may selectively route the upstream signal to the network, e.g., via port 602. Thus, the upstream signal may not be processed and therefore its characteristics may be substantially preserved. It would be readily appreciated perceived by persons having ordinary skill in the art that the above functional description of the XDTV-XTB is exemplary only. The same or similar objectives may be accomplished by applying different components, alternative interconnections, different component values and the like. Diverse supplementary functions may be added to enhance the operation of the set top box device and diverse advanced applications may be contemplated to benefit from the concepts underlying the operation of the device.

Figure 9:
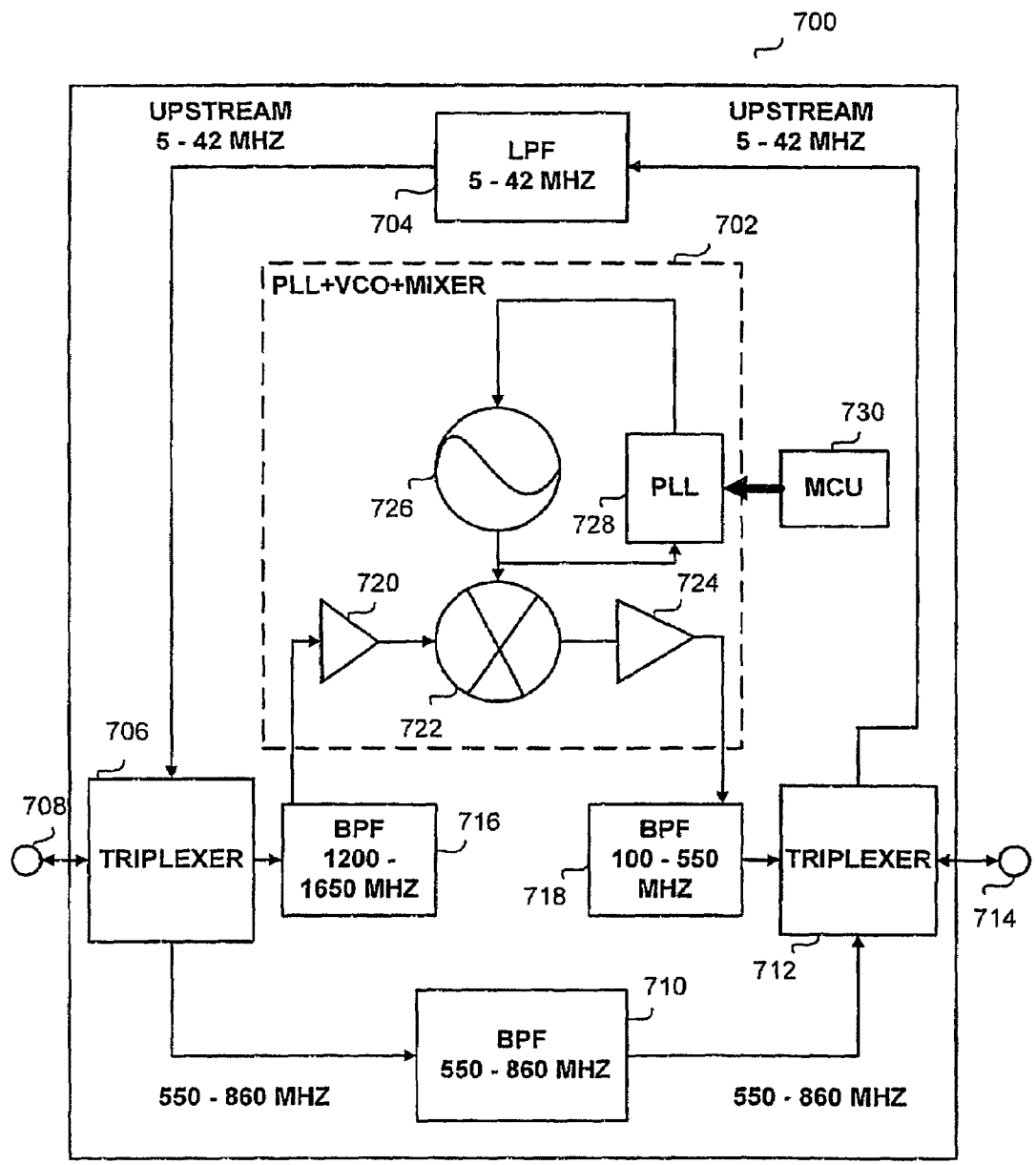
FIG. 9 is a schematic illustration of a subscriber interface apparatus in accordance with still another exemplary embodiment of the invention.

Referring now to FIG. 9, a wideband subscriber interface unit 700 (also referred to herein as "WXTB") according to still another exemplary embodiment of the invention is shown.

WXTB 700 may enable the addition of digital information and/or the use of a full downstream spectrum, e.g., of 120-860 MHz. In a manner similar to some other exemplary embodiments of the invention, the additional digital information may be transmitted downstream from the network head-end in an extended downstream frequency band, e.g., of 1200-1650 MHz. WXTB 700 may perform at least one of the following: a) down-convert an extended downstream signal in the extended downstream frequency band, e.g., of 1200-1650 Mhz, into a down-converted downstream signal in a frequency band, e.g., of 100-550 MHz; b) selectively route the down converted signal and/or a downstream signal in a legacy frequency band, e.g., of 550-860 MHz, to a subscriber device; and c) selectively route an upstream signal from the subscriber device to the CATV network. Device 700 may include a first multiplexer, e.g., a first triplexer 706, at a port 708, to selectively route the extended downstream signal to a down-converter configuration, e.g., implemented as an IC chip 702; to selectively route the legacy downstream signal to a second multiplexer, e.g., a second triplexer 712; and/or to selectively route the upstream signal from the second multiplexer to the network. IC chip 702 may include a PLL/VCO/Mixer (e.g., controlled by a programmable micro-controller unit (MCU) 730) to down convert the extended downstream signal into a signal in a frequency band, e.g., of about 100-550 MHz. The down-converted signal and the legacy downstream signal, in a combined frequency band of about 100-860 MHz, may be routed by the second multiplexer, e.g., to the subscriber's set top box, e.g., via port 714. The upstream signal, e.g., of about 5-42 MHz, may be Touted to the CATV network, e.g., without being processed, and therefore its characteristics may be substantially preserved. It will be readily appreciated by persons of ordinary skills in the art that the above functional description of the wideband subscriber interface device (WXTB) is exemplary only. The same or similar objectives may be accomplished by applying different components, alternative interconnections, different component values and the like. Diverse supplementary functions may be added to enhance the operation of the top box device and diverse advanced applications could be contemplated that could benefit from the concept underlying the operation of the device.

Embodiments of the present invention may be implemented by software, by hardware, or by any combination of software and/or hardware as may be suitable for specific applications or in accordance with specific design requirements. Embodiments of the present invention may include units and sub-units, which may be separate of each other or combined together, in whole or in part, and may be implemented using specific, multi-purpose or general processors, or devices as are known in the art. Some embodiments of the present invention may include buffers, registers, storage units and/or memory units, for temporary or long-term storage of data and/or in order to facilitate the operation of a specific embodiment.

While certain features of the invention have been illustrated and described herein, many modifications, substitutions, changes, and equivalents may occur to those of ordinary skill in the art. It is, therefore, to be understood that the appended claims are intended to cover all such modifications and changes as fall within the true spirit of the invention.

The invention claimed is:

1. An apparatus for connecting a subscriber device supporting a legacy frequency band, occupying the frequency range of 0-1 GHz, to a wideband distribution network supporting a wide frequency band including at least a legacy downstream frequency band and a legacy upstream frequency band comprised in said legacy frequency band, an extended upstream frequency band, occupying the frequency range of 2-3 GHz, exterior to said legacy frequency band and not supported by said subscriber device, and an extended downstream frequency band occupying the frequency range of 1-2 GHz, exterior to said legacy frequency band and not supported by said subscriber device; the apparatus comprising:

an up-converter to up-convert a subscriber upstream signal within a subscriber upstream frequency band within said legacy frequency band supported by said subscriber device, into an up-converted upstream signal within an upstream sub-band of said extended upstream frequency band; and a down-converter to down-convert an extended downstream signal in said extended downstream frequency band into a down-converted downstream signal within a downstream frequency band supported by said subscriber device.

2. The apparatus of claim 1, wherein said up-converter is able to allocate said upstream sub-band based on a predetermined sub-band allocation scheme.

3. The apparatus of claim 1 comprising a multiplexer able to:

selectively route said extended downstream signal to said down-converter; and selectively route said up-converted upstream signal to said network.

4. The apparatus of claim 3, wherein said multiplexer is further able to:

selectively route a downstream signal in said legacy downstream frequency band from said network to another subscriber device supporting said legacy downstream frequency band; and selectively route an upstream signal in said legacy upstream frequency band from the other subscriber device to said network.

5. The apparatus of claim 3 comprising a diplexer to:

selectively route said subscriber upstream signal to said up-converter; and selectively route said down-converted downstream signal to said subscriber device.

6. The apparatus of claim 1, wherein the downstream frequency band supported by said subscriber device comprises at least a sub-set of a frequency band of 100-800 Mhz.

7. The apparatus of claim 1, wherein said extended downstream frequency band comprises at least a sub-set of a frequency band of 1250-1950 Mhz.

8. The apparatus of claim 1 comprising a network diplexer able to:

selectively route a downstream signal in said legacy downstream frequency band from said network to said subscriber device; and selectively route said up-converted upstream signal to said network.

9. The apparatus of claim 8 comprising a subscriber diplexer to:

selectively route said subscriber upstream signal to said up-converter; and selectively route the downstream signal in said legacy downstream frequency band to said subscriber device.

10. The apparatus of claim 9 comprising a splitter to split the downstream signal in said legacy downstream frequency band into first and second downstream signals in said legacy downstream frequency band to be provided to said subscriber diplexer and to another subscriber device, respectively.

11. The apparatus of claim 1, wherein the subscriber upstream frequency band comprises at least a sub-set of a frequency band of 5-60 MHz.

12. The apparatus of claim 1, wherein said extended upstream frequency band comprises at least a sub-set of a frequency band of 2250-2750 Mhz or 1000-1150 MHz.

13. The apparatus of claim 1, wherein said sub-band comprises at least a sub-set of a frequency band of 2250-2280 Mhz, 2400-2430 MHz, 2550-2580 MHz, or 2600-2630 Mhz.

14. The apparatus of claim 1, wherein said subscriber device comprises a customer-premises-equipment device.

15. The apparatus of claim 14, wherein said customer-premises-equipment device comprises a customer-premises-equipment device selected from the group consisting of a legacy set-top-box and a legacy modem.

16. The apparatus of claim 1 comprising a subscriber multiplexer to:
selectively route an upstream signal in said legacy upstream frequency band from said subscriber device to a network multiplexer;
selectively route said down-converted downstream signal to said subscriber device.

17. The apparatus of claim 16 comprising a network multiplexer is able to:
selectively route said extended downstream signal to said down-converter; and
selectively route the upstream signal in said legacy frequency band to said network.

18. The apparatus of claim 17, wherein said network multiplexer is able to selectively route a downstream signal in said legacy downstream frequency band from said network to said subscriber multiplexer, and wherein said subscriber multiplexer is able to selectively route the downstream signal in said legacy downstream frequency band to said subscriber device.

19. The apparatus of claim 1, wherein the subscriber downstream frequency band comprises at least a sub-set of a frequency band of 100-400 MHz or 100-550 MHz.

20. The apparatus of claim 1, wherein said extended downstream frequency band comprises at least a sub-set of a frequency band of 1200-1500 Mhz, or 1200-1650 MHz.

21. The apparatus of claim 1, wherein said legacy upstream frequency band and said legacy downstream frequency band comprise at least a sub-set of a legacy frequency band of 5-1000 MHz.

22. A method of connecting a subscriber device supporting a legacy frequency band occupying the frequency range of 0-1 GHz, to a wideband distribution network supporting a wide frequency band including at least a legacy downstream frequency band and a legacy upstream frequency band comprised in said legacy frequency band, and an extended upstream frequency band, in the frequency range of 2-3 GHz, exterior to said legacy frequency band and not supported by said subscriber device, and an extended downstream frequency band, in the frequency range of 1-2 GHz, exterior to said legacy frequency band and not supported by said subscriber device, the method comprising:
up-converting a subscriber upstream signal within a subscriber upstream frequency band within said legacy frequency band supported by said subscriber device, into an up-converted upstream signal within an upstream sub-band of said extended upstream frequency band; and
down-converting an extended downstream signal in said extended downstream frequency band into a down-converted downstream signal within a downstream frequency band within said legacy frequency band supported by said subscriber device.

23. The method of claim 22 comprising allocating said upstream sub-band based on a predetermined sub-band allocation scheme.

24. The method of claim 22 comprising:
selectively routing said extended downstream signal to a down-converter; and
selectively routing said up-converted upstream signal to said network.

25. The method of claim 24 comprising:
selectively routing a downstream signal in said legacy downstream frequency band from said network to another subscriber device supporting said legacy downstream frequency band; and
selectively routing an upstream signal in said legacy upstream frequency band from the other subscriber device to said network.

26. The method of claim 24 comprising:
selectively routing said subscriber upstream signal to an up-converter; and
selectively routing said down-converted downstream signal to said subscriber device.

27. The method of claim 22, wherein the downstream frequency band supported by said subscriber device comprises at least a sub-set of a frequency band of 100-800 Mhz.

28. The method of claim 22, wherein said extended downstream frequency band comprises at least a sub-set of a frequency band of 1250-1950 MHz.

29. The method of claim 22 comprising:
selectively routing a downstream signal in said legacy downstream frequency band from said network to said subscriber device; and
selectively routing said up-converted upstream signal to said network.

30. The method of claim 29:
selectively routing said subscriber upstream signal to an up-converter; and
selectively routing the downstream signal in said legacy downstream frequency band to said subscriber device.

31. The method of claim 30 comprising a splitting the downstream signal in said legacy downstream frequency band into first and second downstream signals in said legacy downstream frequency band to be provided to said subscriber diplexer and to another subscriber device, respectively.

32. The method of claim 22, wherein the subscriber upstream frequency band comprises at least a sub-set of a frequency band of 5-60 Mhz.

33. The method of claim 22, wherein said extended upstream frequency band comprises at least a sub-set of a frequency band of 2250-2750 MHz or 1000-1150 Mhz.

34. The method of claim 22, wherein said sub-band comprises at least a sub-set of a frequency band of 2250-2280 MHz, 2400-2430 MHz, 2550-2580 Mhz, or 2600-2630 Mhz.

35. The method of claim 22 comprising:
selectively routing an upstream signal in said legacy upstream frequency band from said subscriber device to a network multiplexer;
selectively routing said down-converted downstream signal to said subscriber device.

36. The method of claim 35 comprising:
selectively routing said extended downstream signal to a down-converter; and
selectively routing the upstream signal in said legacy frequency band to said network.

37. The method of claim 36 comprising:
selectively routing a downstream signal in said legacy downstream frequency band from said network to said subscriber device.

38. The method of claim 22, wherein the subscriber downstream frequency band comprises at least a sub-set of a frequency band of 100-400 Mhz or 100-550 Mhz.

39. The method of claim 22, wherein said extended downstream frequency band comprises at least a sub-set of a frequency band of 1200-1500 MHz, or 1200-1650 MHz.

40. A system comprising:
  a wideband distribution network supporting a wide frequency band including at least a legacy downstream frequency band and a legacy upstream frequency band comprised in a legacy frequency band, occupying the frequency range of 0-1 GHz, supported by a subscriber device, an extended upstream frequency band, in the frequency range of 2-3 GHz, exterior to said legacy frequency band and not supported by a subscriber device, and an extended downstream frequency band, in the frequency range of 1-2 GHz, exterior to said legacy frequency band and not supported by said subscriber device;
an apparatus for connecting said subscriber device supporting said legacy frequency band to said network, said apparatus comprising an up-converter to up-convert a subscriber upstream signal within a subscriber upstream frequency band within said legacy frequency band supported by said subscriber device, into an up-converted upstream signal within an upstream sub-band of said extended upstream frequency band; and
    a down-converter to down-convert an extended downstream signal in said extended downstream frequency band into a down-converted downstream signal within a downstream frequency band supported by said subscriber device.

41. The system of claim 40, wherein said apparatus comprises a network diplexer able to:
  selectively route a downstream signal in said legacy downstream frequency band from said network to said subscriber device; and
  selectively route said up-converted upstream signal to said network.

42. The system of claim 41, wherein said apparatus comprises a subscriber diplexer to:
  selectively route said subscriber upstream signal to said up-converter; and
  selectively route the downstream signal in said legacy downstream frequency band to said subscriber device.

43. The system of claim 40, wherein said apparatus comprises a subscriber multiplexer to:
  selectively route an upstream signal in said legacy upstream frequency band from said subscriber device to a network multiplexer;
  selectively route said down-converted downstream signal to said subscriber device.

44. The system of claim 40, wherein said apparatus comprises a network multiplexer is able to:
  selectively route said extended downstream signal to said down-converter; and
  selectively route the upstream signal in said legacy frequency band to said network.

\* \* \* \* \*